J. EWASHKO.
MILK BOX.
APPLICATION FILED NOV. 16, 1921.

1,434,810.

Patented Nov. 7, 1922.
2 SHEETS—SHEET 1.

INVENTOR.
John Ewashko
BY
George C. Heimore
ATTORNEY.

J. EWASHKO.
MILK BOX.
APPLICATION FILED NOV. 16, 1921.
1,434,810.
Patented Nov. 7, 1922.
2 SHEETS—SHEET 2.
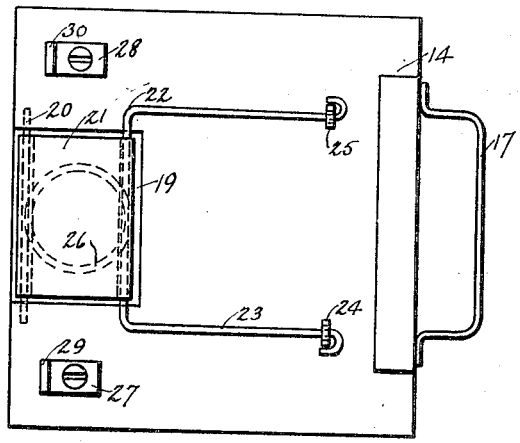
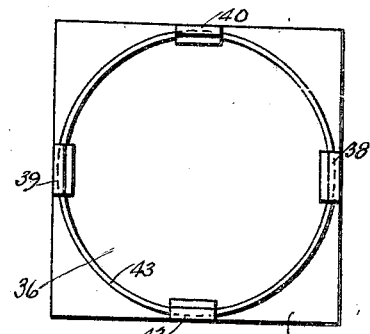
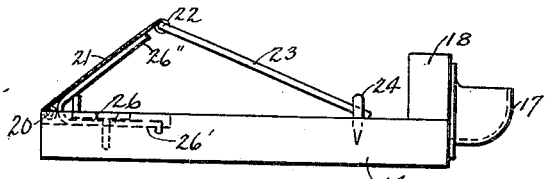
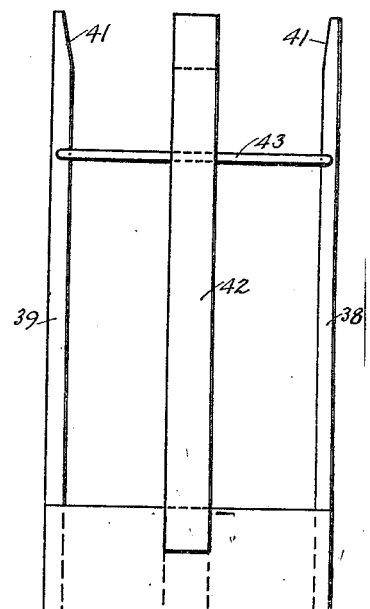
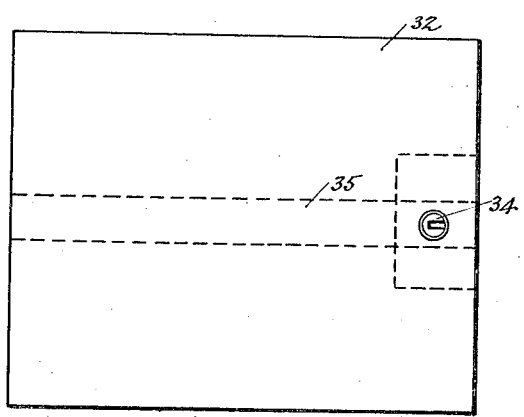
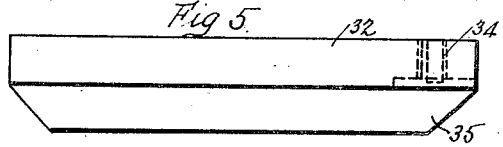
INVENTOR.
John Ewashko
BY George C. Heinrich
ATTORNEY.

Patented Nov. 7, 1922.

1,434,810

UNITED STATES PATENT OFFICE.

JOHN EWASHKO, OF ARKVILLE, NEW YORK.

MILK BOX.

Application filed November 16, 1921. Serial No. 515,573.

*To all whom it may concern:*

Be it known that I, JOHN EWASHKO, a citizen of Russia, residing at Arkville, county of Delaware, and State of New York, have invented certain new and useful Improvements in Milk Boxes, of which the following is a specification.

This invention relates to improvements in deposit and collection receptacles, particularly receptacles for depositing milk bottles, and it is the principal object to provide a receptacle of this kind into which the milk bottles may be readily deposited and locked against removal by unauthorized persons.

Another object of the invention is the provision of a device of this character comprising movable slides or lids which when pulled out allow a deposition of the milk bottle in the receptacle, and when pushed in form a closure over the same as they are adapted to be locked by the deposited milk bottle against withdrawal so that only authorized persons possessing a key to the box or receptacle may remove the milk bottles from the receptacle.

A further object of the invention is the provision of a milk bottle receptacle having hinged lower doors provided with a lock allowing a removal of the bottles, deposited into the receptacle from the top, by a person having a key to the lock.

These and other objects and advantages of my invention will become known as the description thereof proceeds, and will then be more specifically pointed out in the appended claims.

In the accompanying drawings forming a material part of this disclosure:

Figure 3 is a bottom plan view of one of the lids.

Figure 4 is a side view thereof.

Figure 5 is a top plan view of a door.

Figure 6 is a side view thereof.

Figure 7 is a detail top plan view of one of the bottle receivers, and

Figure 8 is a side view of this receiver.

Figure 1:
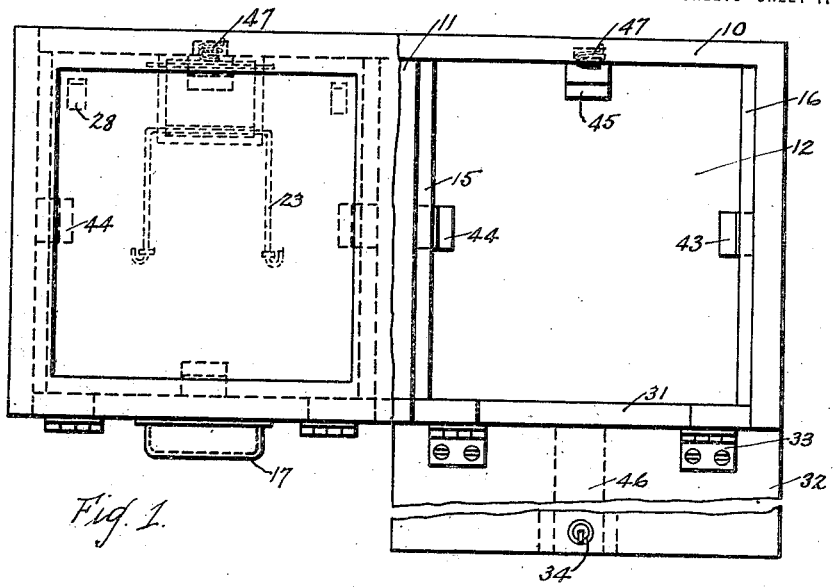
Figure 1 is a top plan view of a receptacle for two bottles constructed according to the present invention showing on the left the lid over the milk bottle closed while the lid over the bottle on the right is removed altogether.
Figure 2:
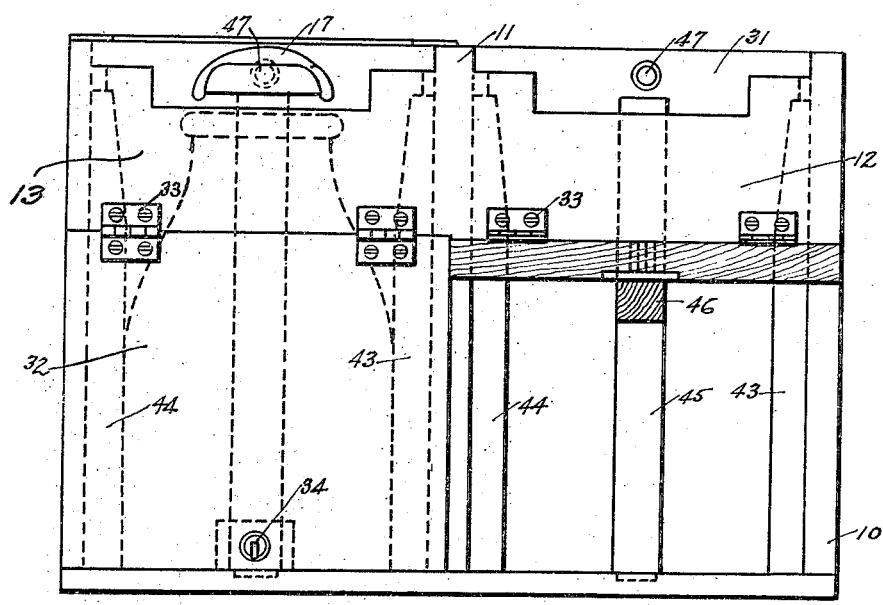
Figure 2 is a side view of a receptacle illustrated in Figure 1.

The box 10 is divided by means of a central partition 11 into two compartments 12 and 13.

Lids or slides 14 of a construction illustrated in detail in Figure 3 are guided over slide-ways 15 and 16 near the top of the receptacle. Each of the slides 14 has a handle 17 attached to its front edge and a cleat 18 secured to its bottom face on said front edge. At the inner face opposite to the cleat 18 each slide has a depressed part 19 near the rear end, in the side walls of which the ends of a pin 20 are secured around which the material of the rear edge of a plate 21 is rolled, allowing a swinging of said plate around said pin. The front edge of the material of plate 21 is rolled for movement around the connecting rod 22 of a wire loop 23, the free ends of which are anchored to eyes 24 and 25 secured in the lower face of the lid 14. A strong angular S-spring 26 rests with its lower end 26' in the depression of the lid and with its upper end 26'' against the lower face of plate 21 tending to normally hold the plate at an angular position to lid 14 as shown in Figure 4.

Angular catches or stops 27 and 28 are secured to the under face of the lids and their downturned flanges 29 and 30 respectively act as stops preventing a complete withdrawal of the slide or lid 14 when it has been pushed in through opening 31 in the front wall of the receptacle 10.

At the front each of the compartments 12 and 13 is closed by a door 32 hinged to the box 10 as indicated at 33, and each door 32 is provided with a lock 34 at its end by means of which the box may be opened and closed by the person possessing the key.

The inner face of each door is provided with a cleat 35 having bevelled front and rear edges. In each of the compartments 12 and 13 a milk bottle receiving or depositing frame 36 is provided, illustrated in detail in Figures 7 and 8 each of which consists of a base 37 to which are secured the lower ends of lateral uprights 38 and 39 and the rear upright 40.

The uprights have bevelled upper edges as indicated at 41 and the front upright 42 is secured near its upper end to a ring 43 which is passed also through the other uprights 38, 39 and 40.

The lower end of the front upright 42 is not secured to the base 37, but fits loosely and snugly into a recess provided in the upper front face of the base.

The rear faces of the uprights 38, 39, 40 and 42 are adapted to snugly engage respectively cleats 43, 44, 45 secured to the side and rear walls of the receptacle 10 and 46 attached to the rear face of door 32.

In suitable recesses in the rear wall of the receptacle 10 are arranged small spiral springs 47.

In operation my device is used as follows:

The milkman pulls the lids 14 by means of their handles 17 forward and opens thus the top of the compartments 12 and 13. The forward movement of the lids, as can be clearly observed from Figure 4, will depress loops 23 and the plate 21 against the action of S-spring 26, after a bottle has been placed into each compartment, he will close the lids over slides by pushing the same inwardly, so that the plate 21 will be pressed downwardly. As soon as the loop has passed the milk bottle its pin 22 will rest against the rear face of the bottle underneath the upper flange of the same so that the lid cannot be pulled forward, as long as a bottle is within the receptacle.

If now the possessor of a key opens the doors 32, he can easily remove the bottles by pulling the same forward as the forward upright 42 will easily yield. After taking the bottle out he locks the doors again, and the receptacle will be ready for the reception of other bottles.

Having thus described my invention, what I claim is:

1. A receptacle for the safekeeping of bottles comprising front doors, locks for said doors, frames adapted to be placed into said receptacle and to receive and hold the bottles, slides closing the top of said receptacle, means connected with said slides and co-operating with said frames and bottles within the same for locking said slides against forward movement, and means for allowing a removal of the bottles from said frames.

2. A receptacle for the safekeeping of milk bottles comprising hinged front doors, locks at the lower part of said doors, frames adapted to be placed into said receptacle and to receive the bottles from the top and hold them, slides closing the top of said receptacle, springs for normally pressing said slides forward, means connected with said slides and co-operating with said frames and bottles within the same for locking said slides against forward movement after their closure over said bottles, the forward bars of said frames being loose to allow the withdrawal of the bottles from the frames through the front doors, and stops upon the lower face of said slides for limiting the forward movement.

3. In a receptacle for the safekeeping of milk bottles, slides adapted to close the top of said receptacle, each of said slides having a rear depression comprising a front handle, a loop secured with its hooked front ends to the lower face of the slide, a plate rolled at one end around the connecting bar of the loop, a pin in the depression of said slide around which the other end of the material of said plate is rolled, and a strong S-spring angularly bent to engage the bottom of the depression and the rear of said plate the connecting bar of said loop adapted to engage behind a milk bottle in said frame for locking said slide against forward motion.

4. In a receptacle of the class described for safeguarding the delivery of milk bottles, a receptacle having two chambers, four vertical cleats having bevelled edges in each of said chambers, a frame comprising four uprights adapted to engage said cleats with their rear faces, and to be placed in said chambers, a ring passed through said uprights near their upper ends, a base to which the lower ends of three of said uprights are secured provided with a recess in which the lower end of the fourth and front upright is loosely engaged, means for allowing a placing of a milk bottle into said frame through the top of said receptacle, means co-operating with said top, frame and milk bottle for locking the same in position and preventing a removal of the same through the top of said receptacle, doors for said receptacle provided with locks for allowing a removal of the milk bottle at the lower front part of the receptacle, lids closing the top of said receptacle and means for limiting the forward movement of said lids.

In testimony whereof I have affixed my signature.

JOHN EWASHKO.